July 24, 1956     O. T. WEBBER     2,756,425
SERVO-COOKER
Filed Jan. 4, 1955     2 Sheets-Sheet 1
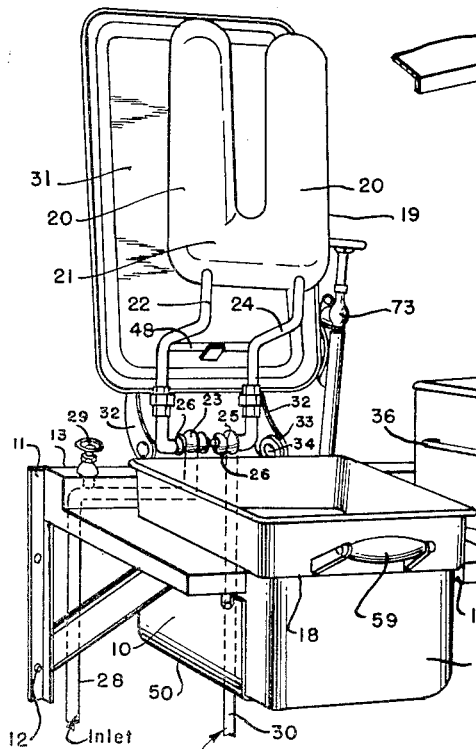
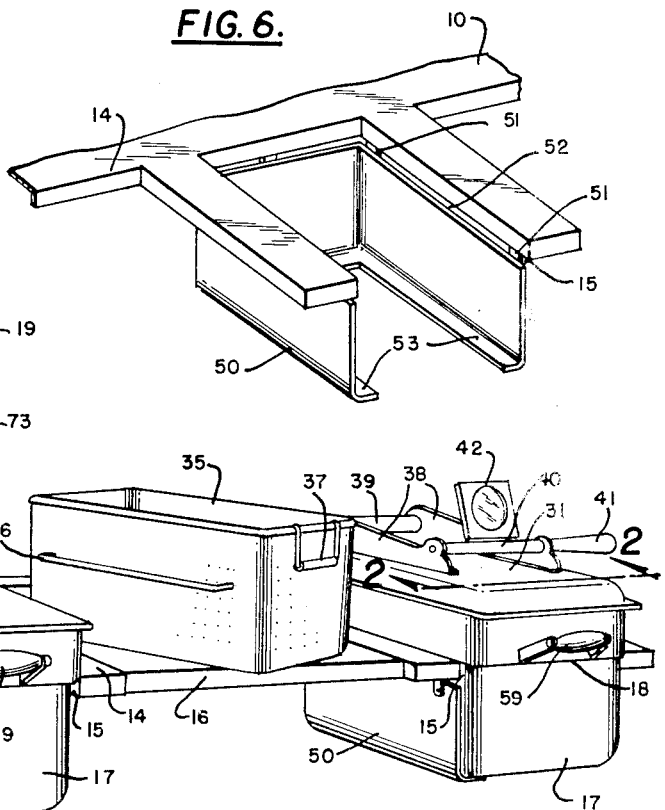
INVENTOR
OWEN T. WEBBER
BY Cushman Darby Cushman
ATTORNEYS

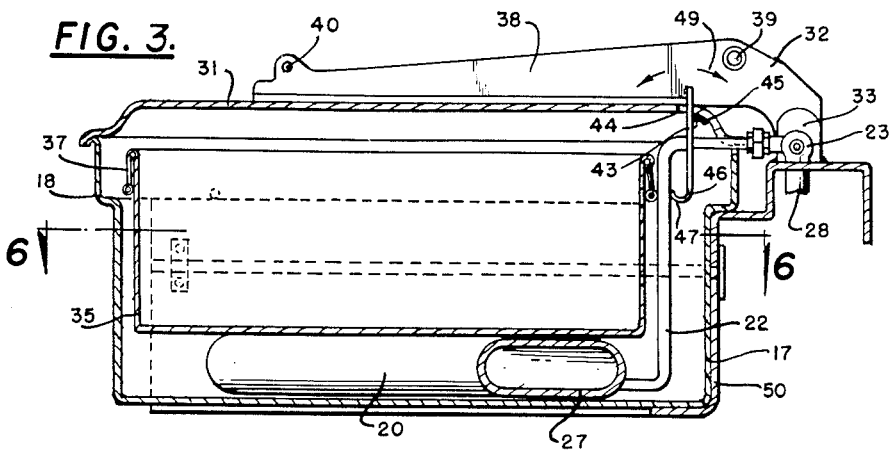
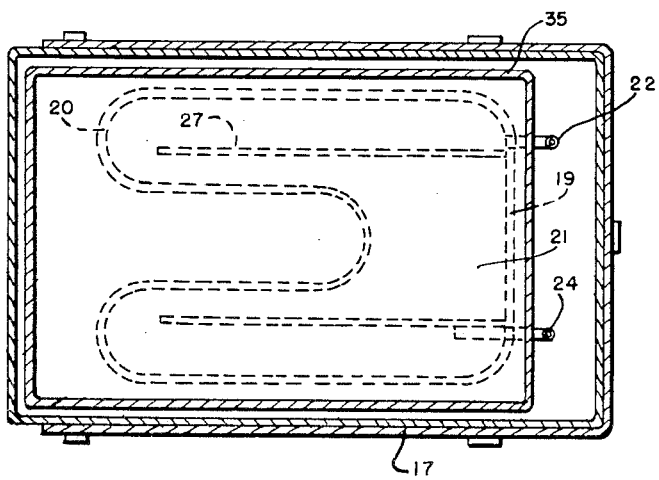
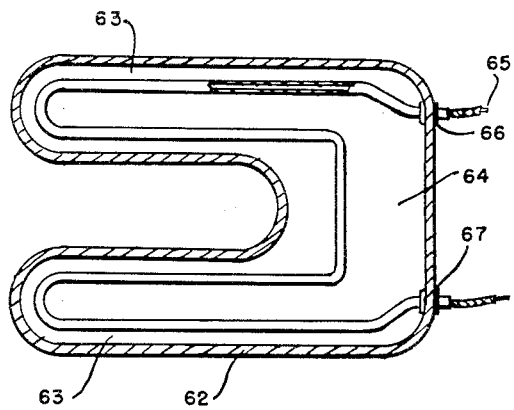
INVENTOR
OWEN T. WEBBER

United States Patent Office 2,756,425
Patented July 24, 1956

2,756,425

SERVO-COOKER

Owen T. Webber, New York, N. Y., assignor to Legion Utensils Co., Long Island City, N. Y., a partnership Application January 4, 1955, Serial No. 479,810

3 Claims. (Cl. 126—378)

The present invention relates to multi-purpose cookers for use in serving hot foods in large quantities. The invention is an improvement over the cooker embodied in my copending application, Serial No. 245,048, filed September 4, 1952.

An important object is to provide an improved cooking assembly including a fixed substantially horizontally disposed base having one or more recessed portions extending inwardly from one side thereof so as to form a receptacle bay. A shouldered receptacle is arranged to slidably engage the side walls of the bay so as to be supported thereby. A movable heating member is positioned within the receptacle and is preferably in the form of substantially flat U-shape hollow pad arranged to be positioned adjacent the bottom of the receptacle so as to spread the heat over a wide area and insure the thorough and rapid heating of the food being treated in the receptacle. A colander basket is arranged to be positioned within the receptacle immediately above the heating member. A group of baskets could occupy the space permitting cooking different foods, such as vegetables or the like at the same time.

A further object consists in associating with the receptacle and heater a removable cover for closing the receptacle. The cover is provided with means arranged to releasably engage the heating member so that when the parts are in their closed position, and the cover is raised to open the receptacle, it will simultaneously cause the withdrawal of the heating member from the receptacle.

Another object comprehends the provision of a cooking assembly for serving hot food in an appreciable volume such as the feeding of military personnel, cafeteria service, and inmates of large institutions where the menu is simple. The assembly includes the provision of means for cooking and serving the food, so that it is not transferred from the time it is cooked to the time it is dished out on the plates, but remains in the same receptacle. Additionally, any number of different foods can be cooked and served to a large number of people at a minimum expenditure of time, effort and cost.

Other objects of the invention will become apparent from the following description when taken in conjunction with the accompanying claims and drawings.

Referring to the drawings in which are shown several preferred embodiments the invention may assume:

Figure 1 is a perspective view of a cooking counter showing my improved cooking assembly, associated therewith;

Figure 2 is an enlarged sectional view taken substantially along the line 2—2 of Figure 1;

Figure 3 is an enlarged sectional view of the cooker of Fig. 1;

Figure 4 is a sectional view taken substantially along the line 6—6 of Figure 3;

Figure 5 is a detailed sectional plan view of a modified form of heating member of the "calrod" type;

Figure 6 is a detailed perspective view of a counter showing a receptacle bay provided with an apron; and Figure 7 is a detailed plan view of a modified form of heating member or pad.

Referring to the drawings, and particularly Figure 1, 10 indicates a substantially horizontally disposed base or cooking counter constructed in accordance with the present invention and which may be secured to the side wall of a building or the like by the supporting bracket 11 and the screws or bolts 12 so as to be maintained firmly in a fixed position in a kitchen, pantry, cafeteria, dining car, galleys of a ship and the like. The base 10 may be provided with a vertically disposed hollow back portion 13 and a horizontally flat portion 14 provided with one or more recesses that constitute receptacle bays 15 which, as shown, may be separated by a work board or panel 16. A receptacle 17 is arranged to fit within each of the recesses or bays 15 and is preferably provided with a shoulder portion 18 adjacent its upper end which is arranged to overlap the adjacent top surfaces of the portion 14 of the base, so as to be supported thereby when slidably inserted into the recess 15 through the open side thereof. A hollow heating member 19 is arranged to be positioned within the receptacle 17 adjacent the bottom and preferably is of substantially U-shape, so as to constitute a heating pad having the spaced parallel hollow arms 20 closed at their outer ends and communicating with each other through a transverse hollow portion 21 preferably positioned adjacent the rear of the base or counter 10. The heating member 19 may be heated by steam and is shown connected through an inlet pipe or tubular member 22 to a fixed supply pipe 23, and through an outlet pipe 24 with a fixed discharge pipe 25, by the pivotal couplings 26 which allow the pipes or arms 22 and 24 and the heating member 19 to be swung from their raised positions, as shown in Figure 1, down into the receptacle 17 so that the heating member is positioned close to the bottom of the receptacle as clearly shown in Figure 2. Each of the hollow arms 20 preferably is provided with a partition member 27 which extends from one end and is spaced from the opposite end, for a purpose subsequently to be described.

Each of the pipes 22 and 24 is of such a length and is so bent as to insure the heating member 19 assuming a flat position adjacent the bottom of the receptacle and allows the heating member 19 to be swung about its pivot from either its raised or lowered position. The pipe 22 communicates with a steam inlet supply pipe 28 which is provided with a valve 29 for controlling the flow of the steam into the heating member 19. The pipe 24 in turn communicates with a discharge or outlet pipe 30 for withdrawing the steam from the interior of the heating member 19. Manifestly, the flow of liquid through the pipes 22 and 24 may be reversed so that the pipe 24 constitutes the inlet and the pipe 22 the outlet for the steam.

A cover or lid 31 is arranged to close the top of the receptacle 17 and is provided with the spaced arms 32 which are pivotally connected by metal fingers to fixed base lugs 33. A colander basket 35 is arranged to be positioned within the receptacle 17 and may be provided on opposite sides thereof with the rods 36 positioned adjacent the top of the basket so as to engage the shouldered portion 18 when positioned within the receptacle 17 (Fig. 2). Thus, it will be seen that the rods 36 constitute flanged means for limiting the downward movement of the basket into the receptacle 17 so as to position the bottom of the basket adjacent the heating member 19 in order to insure the spreading of the heat over a wide area of the basket 35. The basket 35 at its opposite ends may be provided with handles 37 for facilitating the insertion of the basket and its contents into the receptacle 17 or the withdrawal of the same therefrom. Two or three baskets similarly constructed could be arranged to engage the shouldered portion of the receptacle.

The spaced hinged arms 32 may be provided with forwardly extending parallel L-shaped portions 38 (Fig. 3) suitably connected to the top thereof, such as by welding or the like and are connected together adjacent the arms 32 by a cross bar 39 (Fig. 2). A cross bar 40 is similarly connected to the front ends of the portions 38 and has projecting from one side thereof a handle 41. A steam gauge 42 may be mounted on the top adjacent the handle 41. It will be seen that when the parts are in their closed position such as shown in the right hand side of Figure 1, the raising of the handle 41 will cause the cover 31 to be moved about its pivot, so as to permit access into the receptacle 17. The cooking assembly may be used for heating liquids or solid foods by positioning the same directly into the receptacle so as to contact with the heating member 19. For heating most solid foods the same are initially positioned within the colander basket 35 and after the heating member 19 is lowered to the position as shown in Figure 2, the basket 35 is inserted into the receptacle and the cover is lowered so that the parts assume the closed cooking position as shown in Figure 2. The valve 29 is then opened so as to allow the steam to be conducted through the pipe 22 into the heating member 19 where it circulates through the arms 20 and then discharges through the pipe 24. The baffle plates 27 in each of the arms 20 tend to separate the flow of the steam through the heating member and thus eliminates unnecessary noise or hammering which would otherwise develop if the steam were allowed to flow unrestricted through the arms 20.

In order to remove the heating member 19 from the receptacle when the cover 31 is raised to its opened position, lifting means in the form of a releasable member is provided. This releasable means includes a manually operable lever or member 43 which loosely extends through a slot 44 (Fig. 3) in the cover 31 adjacent the rear or hinge portion thereof, and is movably connected to the cover by a hinge 45 (Fig. 3) so that it may swing forwardly or rearwardly in the slot 44. The lower end 46 of the lever 43 preferably terminates in a hook portion 47 which is arranged to releasably engage a cross bar 48 extending between the arms 22 and 24 of the heating member 19 (Fig. 1). Thus, it will be seen that when the colander basket 35 is removed from the receptacle and the heating member 19 and the cover 31 are moved to their closed position, that manual actuation of the lever 43 to the rear as indicated by the arrow 49 (Figure 3) will cause the lower hook portion 47 to engage the cross bar 48, so that upon swinging the cover 31 about its pivot to its raised position, it will simultaneously move the heating member 19 so as to withdraw the same from the receptacle 17 (Figure 1).

Preferably each of the recesses 15 in the base 10 has its rear end and its opposed sides closed by a depending apron 50 which is connected to the base by the straps 51. The apron has its upper edge spaced from the under side of the base to form air openings 52. The lower end of the apron 50 is bent inwardly to provide a supporting flange 53 and is arranged to enclose the rear end and sides of a receptacle 17 so as to constitute a shield or blanket for maintaining the food within the receptacle at an acceptable high temperature. The apron 50 may also serve to prevent dissipation of the heat from the receptacle and tends to deflect cold drafts which would otherwise come in contact with the receptacle. As shown the apron is spaced from the counter and may be provided on its outer surface with an insulating coating. If desired an electrical heating member in the form of "Calrod" or the like (not shown) may be associated with the apron for heating the receptacle so as to maintain the food hot particularly when the receptacles are mounted in a serving counter.

In instances where the colander basket 25 is not used, such as in cooking stew, the heating member or pad 19 may be lowered into the receptacle 17, and after the cooking is completed it may be removed therefrom. In this connection it might be observed that the heating member 19 is of substantially U-shape and provides the spaced arms 20 so that when the heating member is raised from the receptacle, none of the food will adhere thereto as might happen if it was of a flat uninterrupted shape.

While steam has been shown as the heating medium for raising the heating member 19 to the desired temperature, it will be manifest that other means may be used. As an example in Figure 5 a hollow heating member or pad 62 of substantially U shape may be provided and has the hollow spaced arms 63 which are connected at their rear ends by transverse hollow portion 64. Electrical means such as a "Calrod" 65 may extend through an opening 66 and be shaped or bent to pass through the arms 63 and be removed therefrom through an opening 67 so as to insure heating of the member 62 over a wide area.

In the modified form of the invention shown in Figure 7 the hollow U-shaped heating member 68 may have the steam introduced therein through an inlet pipe 69 that extends into one of the arms 70 of the heating member and is removed therefrom through the discharge pipe 71 in the other arm of the heating member. Additionally each of the arms 70 has mounted therein a baffle plate 72 so as to reduce the pressure of the steam as it is introduced into the arms 70.

Heretofore it has been customary to provide a steam table or an electrically heated well into which each receptacle is placed, for the purpose of maintaining the food in proper cooking condition. Such arrangements involve expensive equipment and allows a lot of the heat to be dissipated. The present invention supplants the steam table and electrical heating means as previously used, and provides a totally new type of assembly for quickly serving hot foods in either liquid or solid forms where a number of people have to be fed and a large volume of food is consumed. The cooking assembly may be provided with any number of bays, so arranged that a bay in the cooking counter is in substantially transverse alignment with a bay in a serving counter in order that the food in each of the receptacles may be quickly transferred from the cooking counter to the serving counter and each receptacle replenished when emptied. When all the bays are not required to be used, one or more of them can be closed by a panel or board such as 16 (Figure 1) so as to provide a smooth working surface or table. Manifestly, the aprons 50 may be omitted where it is not necessary to provide means for preventing the sudden cooling of a receptacle 17. The use of a substantially flat heating pad or member near the bottom of the receptacle instead of a centrally disposed steam coil has been found particularly satisfactory for heating quickly and thoroughly large quantities of food. The lifting device including the lever 43 and its associated parts provides efficient means for causing the withdrawal of the heating member 19 with the cover 31 when the parts are in their closed position. As each receptacle 17 has a shouldered portion or stop, it may be readily transferred from one bay to another so as to be properly supported in either the cooking counter or serving counter. Moreover, the parts of the assembly are so spaced and arranged that they may be readily cleaned and inspected. The cooking counter may have associated therewith a steam valve (not shown) of the pillar type, and also be provided with a flushing valve for cleaning the counter when the receptacles 17 are removed therefrom and the heating member and cover are in their raised positions. Each of the covers 31 when in its closed position may be clamped to the receptacle so as to provide a tight seal, by any suitable means such as by a removable bolt or the like. The heating member may be in the form of a heat insulating apron made of any suitable insulated material so as to conserve the heat of the receptacle without the use of associating a heating element therewith.

It will be understood that the forms of the invention shown and described are merely illustrative of preferred embodiments and that such changes may be made as come within the scope of the following claims.

I claim:

1. A cooker of the class described including in combination a fixed substantially horizontally disposed base having a recessed portion extending inwardly from one side thereof to form an open receptacle bay of uniform width; a receptacle having a shouldered portion arranged to be slidably received within the bay and engage the upper surfaces of the walls of said bay so as to be supported thereby; a pair of spaced pipes adjacent the rear of the bay; a movable heating member having a fluid passage therein and arranged to be positioned within the receptacle, said heating member having an inlet and a spaced outlet for conducting a fluid heating medium into and out of said heating member; means pivotally connecting said inlet and said outlet of said heating member to said pipes; a cover pivotally connected to said base; and said cover including a movable manually operable lever means arranged to releasably engage a cooperating portion of said heating member so as to cause the same to be raised with the cover when the lever is manually actuated and the cover is moved upwardly relative to the receptacle and when not actuated, to permit raising of the cover without disturbing the heating member.

2. A cooker as called for in claim 1 in which the heating member includes a substantially U-shaped flat hollow pad with downwardly and inwardly sloping sides and spaced inlet and outlet supporting pipes secured thereto, whereby the pad when moved into the receptacle is horizontally positioned adjacent the bottom thereof and when removed is positioned to readily drain and preclude adherence thereto of food being cooked.

3. A cooker as called for in claim 1 in which a depending apron is connected around the sides and back of the bay so as to shield said receptacle when slid into said bay.

References Cited in the file of this patent

UNITED STATES PATENTS

| 522,586 | Cascaden | July 10, 1894 |
| 887,923 | Crandall | May 19, 1908 |
| 1,159,304 | Wells | Nov. 2, 1915 |
| 1,513,357 | Webber | Oct. 28, 1924 |
| 2,084,614 | Goecke | June 22, 1937 |
| 2,142,019 | Warner | Dec. 27, 1938 |
| 2,154,216 | Savage | Apr. 11, 1939 |
| 2,266,100 | Uhlrig | Dec. 16, 1941 |
| 2,286,548 | Jackson et al. | June 16, 1942 |
| 2,497,241 | Spigel | Feb. 14, 1950 |
| 2,668,527 | Chambers | Feb. 9, 1954 |